United States Patent [19]
Jozokos et al.

[11] Patent Number: 5,811,490
[45] Date of Patent: Sep. 22, 1998

[54] POLYAMIDE COATING COMPOSITIONS HAVING A BALANCE OF RESISTANCE PROPERTIES

[75] Inventors: Mark A. Jozokos, Pelham, N.H.; Young Joon Kim, Greenfield; Wei Zhu, Sunderland, both of Mass.

[73] Assignee: Judd Wire, Inc., Turner Falls, Mass.

[21] Appl. No.: 783,580

[22] Filed: Jan. 13, 1997

[51] Int. Cl.⁶ ...................................................... C08L 77/00
[52] U.S. Cl. .............................. 525/66; 525/179; 525/183
[58] Field of Search ................................ 525/66, 183, 179

[56] References Cited

U.S. PATENT DOCUMENTS

| | | | |
|---|---|---|---|
| 3,845,163 | 10/1974 | Murch | 325/183 |
| 4,174,358 | 11/1979 | Epstein | 525/183 |
| 4,299,744 | 11/1981 | Stewart | 525/183 |
| 4,485,214 | 11/1984 | Ochiai et al. | 525/179 |
| 4,536,533 | 8/1985 | Chen et al. | 524/161 |
| 4,690,981 | 9/1987 | Statz | 525/329.6 |
| 4,766,174 | 8/1988 | Statz | 525/64 |
| 4,851,473 | 7/1989 | Dunphy | 525/66 |
| 4,885,340 | 12/1989 | Hamada et al. | 525/183 |
| 4,977,216 | 12/1990 | Elia | 525/183 |
| 5,061,757 | 10/1991 | Warner | 525/179 |
| 5,126,407 | 6/1992 | Subramanian | 525/179 |
| 5,200,468 | 4/1993 | Pickton | 525/183 |
| 5,210,138 | 5/1993 | Yamamoto et al. | 525/183 |
| 5,244,969 | 9/1993 | Yamada | 524/908 |
| 5,290,865 | 3/1994 | Ohmae et al. | 525/183 |
| 5,420,206 | 5/1995 | Mason et al. | 525/179 |

*Primary Examiner*—Ana Woodward
*Attorney, Agent, or Firm*—Mary R. Bonzagni, Esq.; Holland & Bonzagni, P.C.

[57] ABSTRACT

Polyamide coating compositions that demonstrate strength and toughness, flame and corrosion resistance and resistance to hydrolysis and thermal degradation at coating thicknesses of less than or equal to 0.25 mm or 0.15 mm are provided. Such coating compositions are extremely useful for coating wires or cables that are housed in automotive electrical harnesses.

9 Claims, No Drawings

POLYAMIDE COATING COMPOSITIONS HAVING A BALANCE OF RESISTANCE PROPERTIES

FIELD OF THE INVENTION

The present invention generally relates to polyamide compositions, and more specifically to polyamide coating compositions having a balance of resistance properties including flame and corrosion resistance in addition to resistance to heat aging, abrasion and hydrolysis.

BACKGROUND OF THE INVENTION

Automotive parts, such as wire harnesses for connecting a number of electric devices mounted on an automotive vehicle, are typically routed through crowded engine compartments that reach temperatures ranging from −40° C. to 200° C. The insulated wires that make up these wire harnesses are not only exposed to this expansive and fluctuating temperature range but are also exposed to water and possibly to flames and corrosive fluids that have the potential to erode, swell or otherwise degrade the insulation that covers these wires. Therefore, the insulation, by necessity, has to demonstrate strength and toughness, flame and corrosion resistance and resistance to hydrolysis and thermal degradation.

Trends in the automotive industry have resulted in increases in the number of electrical devices mounted on an automotive vehicle in addition to reductions in the size of engine compartments. As a result, weight and volume restrictions have been placed upon the components that are housed in the engine compartments. In specific regard to automotive electrical harnesses, restrictions as to the thickness of the insulating coating on the wires that make up the electrical harnesses have been required by the automotive industry.

The insulated wires that are currently used in electrical harnesses typically employ a polyvinyl chloride (PVC) insulating coating having a wall thickness of about 0.40 mm. While these PVC insulated wires satisfy minimum performance requirements set by the automotive industry when exposed to temperatures up to about 105° C., deterioration of the insulating coating's physical and mechanical properties has been noted when these insulated wires are exposed to temperatures exceeding 105° C.

Current specifications from auto makers now require ultra thin wall harness wire having insulation wall thicknesses of 0.25 mm or 0.15 mm. However, at such thicknesses the drawbacks or problems associated with PVC insulated wires would render ultra thin wall PVC insulated wires unsuitable for the above-referenced automotive applications.

It is well known that polyamides in general use today such as nylon 6, nylon 6,6 and the various copolymers are desirable for most applications. However, their desirability diminishes for specialty applications such as electrical insulation of automotive parts which, as alluded to above, require exceptional physical, mechanical, electrical and thermal properties. In particular, nylons are degraded by hydrolysis at elevated temperatures and, to a certain degree, are degraded by strong acids. Good mechanical properties are maintained only up to about 125° C.

The prior art describes various techniques for modifying polyamides with tougheners. Such tougheners include low modulus ethylene copolymers that contain carboxyl or anhydride functionality. Other tougheners include ethylene acid copolymers neutralized with metal cations. (See U.S. Pat. No. 5,126,407 to Subramanian).

Combinations of polyamides with such tougheners afford compositions that are tough and suitable for injection molding and extrusion yet still unsuitable for the above-referenced electrical applications. In particular, such combinations continue to render compositions that lack the necessary resistance to hydrolysis and strong acids especially at elevated temperatures and under humid conditions.

Accordingly, there is a need for harness wire and especially ultra thin wall harness wire that overcomes the drawbacks associated with the prior art and that demonstrates strength, toughness and a balance of resistance properties.

It is therefore an object of the present invention to provide a thermoplastic coating composition that can be used as an insulating coating for wire and that demonstrates strength, toughness and a balance of resistance properties.

It is a more particular object to provide an insulating coating composition for wire that, when applied at coating thicknesses of less than or equal to 0.25 mm or 0.15 mm, demonstrates strength, toughness and a balance of resistance properties.

It is a further object of the present invention to provide an ultra thin wall insulated wire product that demonstrates the above-referenced properties.

It is yet a further object to provide an insulated conductor made up of a plurality of ultra thin wall insulated wires that each demonstrate the above-referenced properties.

SUMMARY OF THE INVENTION

The present invention therefore relates to a thermoplastic coating composition comprising:

a. a polyamide selected from the group consisting of nylon 610, nylon 612, nylon 11, nylon 12 and blends thereof;

b. an ionic copolymer of at least one α-olefin having from 2 to 6 carbon atoms and at least one α,β-unsaturated organic carboxylic acid having from 3 to 6 carbon atoms which is partially or completely neutralized with zinc ions; and c. an unsaturated dicarboxylic anhydride compatibilizer; where the ionic copolymer is present in an amount ranging from about 18 to about 27% by wt. based on the total amount of polyamide present in the composition; and where the unsaturated dicarboxylic anhydride of the unsaturated dicarboxylic anhydride compatibilizer is present in an amount ranging from about 0.2 to about 4.0% by wt. based on the total amount of ionic copolymer present in the composition.

The present invention also relates to an insulated wire comprising a wire having a thermoplastic coating composition, as described above, releaseably adhered thereto.

The present invention further relates to an insulated conductor comprising a plurality of bunched, twisted or bundled insulated wires, as described immediately hereinabove.

The foregoing and other features and advantages of the present invention will become more apparent from the following description.

DETAILED DESCRIPTION OF THE INVENTION

Although the present inventive thermoplastic coating composition will be described herein in reference to insulated wires housed or bundled in automotive electrical harnesses, it is not so limited. This coating composition can be utilized on any surface in which strength and toughness and a balance of resistance properties, including flame and corrosion resistance in addition to resistance to heat aging, abrasion and hydrolysis, are desired.

The polyamides used in the present invention are higher nylons such as polyhexamethylene sebacamide (nylon 610), polyhexamethylene dodecanoamide (nylon 612), polyundecaneolactam (nylon 11) and polydodecanolactam (nylon 12) and can be produced by any conventional means known in the art.

Preferred polyamides include nylon 11 and nylon 12, as well as mixtures of the same. Of these preferred polyamides, nylon 11 is the most preferred.

The polyamide component of the inventive composition is present in amounts of from about 45 to about 70% by wt. based on the total weight of the composition.

The ionic copolymers used in the present invention have repeating units of at least one $\alpha$-olefin and at least one $\alpha,\beta$-unsaturated carboxylic acid, in which the acid moiety is at least partially neutralized with zinc or magnesium ions. In a preferred embodiment the $\alpha$-olefin contains 2 to 6 carbon atoms and the carboxylic acid contains 3 to 6 carbon atoms. In a more preferred embodiment, the $\alpha$-olefin is ethylene and the acid is methacrylic acid. Other polymerizable comonomers, such as acrylates or methacrylates, can also be present. Suitable ionic copolymers may be purchased from E. I. DuPont de Nemours Co. under the trademark "Surlyn" which identifies a family of ionic copolymers.

The ionic copolymers component is preferably present in an amount ranging from about 18 to about 27% by wt. based on the total amount of polyamide present in the composition. It has been discovered that when the ionic copolymer component is present in an amount below this range, the resulting composition exhibits a decrease in hydrolysis resistance and heat aging resistance. When the ionic copolymer component is present in an amount above this range, the resulting composition exhibits a decrease in sandpaper abrasion resistance and deformation or pinch resistance at elevated temperatures.

The compatibilizers used in the present invention constitute either unsaturated dicarboxylic anhydrides such as maleic, itaconic, aconitic or citraconic anhydride or unsaturated dicarboxylic anhydride modified thermoplastic polymers. The anhydrides may be replaced in whole or in part by carboxyl or carboxylate functionality. Thermoplastic polymers suitable for use in the practice of the present invention include polyethylene homopolymers and ethylene propylene copolymers. A preferred unsaturated dicarboxylic anhydride is maleic anhydride, while a preferred anhydride modified thermoplastic polymer is maleic anhydride modified polyethylene.

The unsaturated dicarboxylic anhydride of the unsaturated dicarboxylic anhydride compatibilizer component is preferably present in an amount ranging from about 0.2 to about 4.0% by wt. based on the total amount of ionic copolymer present in the composition. When the unsaturated dicarboxylic anhydride is present in an amount below this range, the resulting composition tends to exhibit inferior heat aging and hydrolysis resistance. When the anhydride is present in an amount above this range, the resulting composition exhibits inferior sandpaper abrasion resistance and pinch resistance at elevated temperatures.

In addition to the above components, the thermoplastic coating composition of the present invention can advantageously contain other additives such as plasticizers, antioxidants, stabilizers, processing aids, flame retardants, cross-linking agents, fibers, minerals, dyes and pigments that do not adversely affect the strength and toughness and resistance properties of the resulting coating composition.

The components of the inventive coating composition can be blended together by any conventional process until a uniform mix is obtained. In particular, the components can be introduced into an extruder, melt-blended and then extruded over wire or cable. The term "melt-blended", as used herein, means blending at a temperature high enough to maintain the polyamide in a molten state. No specific melt-blending conditions are required.

The invention is now described with reference to the following examples which are for the purpose of illustration only and are not intended to imply any limitation on the scope of the invention.

SPECIFIC EMBODIMENTS

COMPONENTS USED

N11—an extrusion grade, heat and light stabilized polyamide 11 resin available from Elf Atochem, Glen Rock, N.C. under the product designation RILSAN® BESNO P40 TL.

IONOMER—a copolymer of ethylene and methacrylic acid that is partially neutralized with zinc ions available from E. I. DuPont, Wilmington, Del. under the product designation SURLYN® 9910.

COMPATIBILIZER—a maleic anhydride modified linear low-density polyethylene available from E. I. DuPont under the designation FUSABOND® MB-226D.

TRANSLINK—a calcined and surface modified aluminum silicate available from Engelhard, Iselin, N.J. under the designation TRANSLINK® 37.

IRGANOX 1010—a hindered phenolic antioxidant available from Ciba-Geigy Corp., Hawthorne, N.Y. under the designation IRGANOX® 1010.

SEENOX—a low volatility, high molecular weight, organic sulfur-containing antioxidant available from Witco Corporation, Oakland, N.J. under the designation SEENOX® 412S.

IRGANOX MD-1024—a hindered phenolic antioxidant/metal deactivator available from Ciba-Geigy under the designation IRGANOX® MD 1024.

SAYTEX—a brominated flame retardant available from Albemarle, Baton Rouge, La. under the designation SAYTEX® BT-93W.

TMS—an antimony trioxide flame retardant available from Anzon Inc., Philadelphia, Pa. under the designation TMS™ antimony trioxide.

200VS SILICA—a fumed silica available from Degussa Corporation, Ridgefield Park, N.J. under the designation AEROSIL® 200VS.

TAIC—a triallyl isocyanurate cross-linking agent available from Nippon Kasei Chemical Co., Ltd., Tokyo, Japan under the designation TAIC® triallyl isocyanurate.

SAMPLE PREPARATION AND TEST METHODS

The components used in the working examples were compounded at approximately 210° C. and then pelletized. The pellets were then dried, melt-blended at approximately 210° C. and then extruded over copper wire to thicknesses of 0.15 mm±0.03 and 0.25 mm±0.05.

The resulting coated wire samples were subjected to the following tests:

Sandpaper Abrasion Resistance Test(mm): Test samples having an insulation thickness of either 0.15 mm or 0.25 mm and measuring 900 mm in length were tested for sandpaper abrasion resistance by removing 25 mm of insulation from one end of each test sample and by horizontally mounting each test sample (taut and without stretching) on a continuous strip of abrasion tape in an apparatus that was custom built according to Military Specification MIL-T-5438 and that was capable of exerting a force on the sample while drawing the abrasion tape under the sample at a fixed rate. For each test, 150J garnet sandpaper (with 10 mm conductive strips perpendicular to the edge of the sandpaper spaced a maximum of every 75 mm) was drawn under the sample at a rate of 1500±75 mm/min while a total force of either 0.98±0.05N (for test samples having an insulation thickness of 0.15 mm) or 2.16±0.05N (for test samples having an insulation thickness of 0.25 mm) was exerted on the test sample. The sandpaper approached and exited each test sample from below at an angle of 29°±2° to the axis of the test sample and was supported by a rod 6.9 mm in diameter. The length of sandpaper necessary to expose the core or wire was recorded and the test sample moved approximately 50 mm and rotated clockwise 90°. The above-referenced procedure was repeated for a total of four readings. The mean of the four readings constituted the sandpaper abrasion resistance for the subject test sample.

Short Term Heat Aging (P,F): Test samples having an insulation thickness of either 0.15 mm or 0.25 mm and measuring approximately 600 mm in length were tested for short term heat aging by removing 25 mm of insulation from each end of each test sample and by placing each sample in a hot air oven, model number 206, manufactured by Blue M, a unit of General Signal, Blue Island, Ill. Samples were spaced at least 20 mm from adjacent test samples and were then fixed to supports located within the oven by the conductors or wires so as to avoid any contact between the insulation and the supports. The oven was then sealed and the temperature maintained at 150°±2° C. for 240 hours. The air contained in the oven was completely changed at least 300 times per hour during this 240 hour period. Immediately after aging, the test samples were withdrawn from the oven and maintained at 23°±5° C. for at least 16 hours without direct solar light. After such conditioning at room temperature a "Winding Test", as described hereinbelow, was performed on each sample.

Winding Test (P,F): For this test, each conditioned test sample was fixed on a rotatable mandrel, wrapped once around the mandrel and the free ends loaded with 500 gram weights and allowed to hang vertically. The test samples and mandrels were then placed in a freezing chamber that was subsequently sealed and brought down to a temperature of −40°±2° C. This temperature was maintained for four (4) hours. The test samples were then wound around the mandrel by turning the mandrel three (3) turns at a winding speed of 1 s$^{-1}$. If no visible defects were noted, a "Withstand Voltage Test", as described hereinbelow, was performed on the sample.

Withstand Voltage Test (P,F): For this test, the ends of each test sample were twisted together to form a loop. The looped test sample was then immersed in a salt solution [3% (m/m) of NaCl in water) contained in a 2000 ml. beaker. The ends of each test sample were located above the solution. A test voltage of 1 kV (rms) was then applied through an electrode between the conductor and the solution for thirty (30) minutes. The voltage was then increased at a rate of 500 V/s until 3 kV was reached. This test was deemed "passed" if no electrical breakdown occurred.

Hydrolysis Test (P,F): Test samples having an insulation thickness of either 0.15 mm or 0.25 mm and measuring approximately 2000 mm in length were separately fixed and wound on mandrels and placed in a water bath. The ends of each wound test sample were positioned outside or above the water in the water bath. One end of each test sample was connected to a positive terminal of a 48V DC power source, and the water bath was connected to the negative terminal. The specific volume resistance of the insulation of each test sample was measured immediately after immersion of the subject test sample by measuring the insulation resistance and by calculating the specific volume resistance. The test samples were then allowed to age in water for 21 days (504 h) at 80° C.±2° C. The specific volume resistance of the insulation of each test sample was measured every three days during this aging period. After the 21 day aging period, the test samples were visually inspected and then subjected to the Withstand Voltage Test described hereinabove. The Hydrolysis Test was deemed "passed" if: the specific volume resistivity of the insulation of the subject test sample remained >10$^8$ ohm/cm throughout the 21 day aging period; the visual inspection failed to show cracks, fractures or other defects in the insulation; and the test sample, upon being subjected to the Withstand Voltage Test, did not demonstrate any electrical breakdown.

WORKING EXAMPLES AND TEST RESULTS

In Examples 1 to 15 various polyamide compositions were prepared and tested and the results tabulated in Table 1. The amounts of the components used are parts by weight and are calculated to add up to a 100 parts by weight total.

TABLE 1

SUMMARY OF EXAMPLES 1 TO 15

| COMPONENTS | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| N11 | -0- | 62.27 | 58.58 | 60.63 | 62.40 | 59.50 | 50.50 | 47.50 | 44.50 | 59.32 | 58.98 | 57.26 | 56.50 | 54.91 | 53.50 |
| IONOMER | 75.50 | 13.23 | 14.65 | 12.87 | 11.34 | 10.00 | 16.00 | 18.00 | 20.00 | 10.79 | 12.52 | 12.16 | 12.00 | 13.73 | 14.00 |
| COMPATIBILIZER | -0- | -0- | 2.27 | 2.00 | 1.76 | 5.00 | 8.00 | 9.00 | 10.00 | 5.39 | 4.00 | 6.08 | 6.00 | 6.86 | 7.00 |
| TRANSLINK | 9.85 | 9.83 | 9.84 | 9.84 | 9.83 | 9.84 | 9.86 | 9.87 | 9.88 | 9.84 | 9.84 | 9.85 | 9.85 | 9 85 | 9.86 |
| IRGANOX 1010 | 0.75 | 0.75 | 0.75 | 0.75 | 0.75 | 0.75 | 0.75 | 0.75 | 0.75 | 0.75 | 0.75 | 0.75 | 0.75 | 0.75 | 0.75 |
| SEENOX | 2.25 | 2.25 | 2.25 | 2.25 | 2.25 | 2.25 | 2.25 | 2.25 | 2.25 | 2.25 | 2.25 | 2.25 | 2.25 | 2.25 | 2.25 |
| IRGANOX MD-1024 | 0.50 | 0.50 | 0.50 | 0.50 | 0.50 | 0.50 | 0.50 | 0.50 | 0.50 | 0.50 | 0.50 | 0.50 | 0.50 | 0.50 | 0.50 |
| SAYTEX | 7.00 | 7.00 | 7.00 | 7.00 | 7.00 | 7.00 | 7.00 | 7.00 | 7.00 | 7.00 | 7.00 | 7.00 | 7.00 | 7.00 | 7.00 |
| TMS | 4.00 | 4.00 | 4.00 | 4.00 | 4.00 | 4.00 | 4.00 | 4.00 | 4.00 | 4.00 | 4.00 | 4.00 | 4.00 | 4.00 | 4.00 |
| 200 VS SILICA | 0.15 | 0.17 | 0.16 | 0.16 | 0.17 | 0.16 | 0.14 | 0.13 | 0.12 | 0.16 | 0.16 | 0.15 | 0.15 | 0.15 | 0.14 |
| TAIC | -0- | -0- | -0- | -0- | -0- | 1.00 | 1.00 | 1.00 | 1.00 | -0- | -0- | -0- | 1.00 | -0- | 1.00 |
| % IONOMER/N11 | — | 21.25 | 25.01 | 21.23 | 18.17 | 16.81 | 31.68 | 37.89 | 44.94 | 18.19 | 21.23 | 21.24 | 21.24 | 25.00 | 26.17 |
| % MA/IONOMER | — | — | 0.14 | 0.14 | 0.14 | 0.45 | 0.45 | 0.45 | 0.45 | 0.45 | 0.45 | 0.29 | 0.45 | 0.45 | 0.45 |
| Sand Paper Abrasion, 0.15 mm wall (mm) | 248 | 343 | 267 | 171 | 229 | 419 | 171 | — | 210 | 324 | 248 | 248 | 274 | 305 | 221 |
| Sand Paper Abrasion 0.25 mm wall (mm) | 248 | 476 | 457 | 343 | 343 | 305 | — | — | 191 | 591 | 343 | 391 | — | 229 | — |

TABLE 1-continued

SUMMARY OF EXAMPLES 1 TO 15

| COMPONENTS | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| Short Term Heat Aging 0.15 mm wall | F | F | F | F | F | F | P | P | P | P | F | P | P | F | P |
| Short Term Heat Aging 0.25 mm wall | F | F | F | F | F | F | — | — | P | P | P | P | — | P | — |
| Hydrolysis | F | P | P | P | P | P | P | P | P | P | P | P | P | P | P |

Working Examples 10 to 15 illustrate the balance of resistance properties (i.e., resistance to heat aging, abrasion and hydrolysis) that can be obtained within the framework of the present invention. It is noted herein that the short term heat aging (0.15 mm wall) failures of Working Examples 11 and 14 were reportedly the result of small surface deformations in the ultra thin insulating coatings of these Examples presumably caused by variations in the extrusion process. Example 1 shows that IONOMER-based compositions do not demonstrate the necessary resistance to hydrolysis and thermal degradation. Example 2 shows that N11/IONOMER-based compositions, while demonstrating increased abrasion resistance and acceptable resistance to hydrolysis, fail to demonstrate the necessary resistance to thermal degradation. Examples 3 to 5 show that N11/IONOMER/COMPATIBILIZER-based compositions having a % MA/IONOMER ratio that falls below 0.2% also fail to demonstrate the necessary resistance to thermal degradation. Example 6 shows that compositions having a % IONOMER/N11 ratio below 18% also fail to demonstrate the necessary resistance to thermal degradation while Examples 7 to 9 show that compositions having a % IONOMER/N11 ratio above 27% demonstrate reduced abrasion resistance.

Although this invention has been shown and described with respect to detailed embodiments thereof, it will be understood by those in the art that various changes in form and detail thereof may be made without departing from the spirit of the claimed invention.

What is claimed is:

1. A thermoplastic coating composition comprising:
    a. a polyamide selected from the group consisting of nylon 610, nylon 612, nylon 11, nylon 12 and blends thereof;
    b. an ionic copolymer of at least one α-olefin having from 2 to 6 carbon atoms and at least one α,β-unsaturated organic carboxylic acid having from 3 to 6 carbon atoms which is partially or completely neutralized with zinc ions; and
    c. an unsaturated dicarboxylic anhydride compatibilizer;
wherein said ionic copolymer is present in an amount ranging from about 18 to about 27% by wt. based on the total amount of polyamide present in said composition; and wherein said unsaturated dicarboxylic anhydride of said unsaturated dicarboxylic anhydride compatibilizer is present in an amount ranging from about 0.2 to about 4.0% by wt. based on the total amount of ionic copolymer present in said composition.

2. The thermoplastic coating composition of claim 1, wherein said polyamide is nylon 11.

3. The thermoplastic coating composition of claim 1, wherein said ionic copolymer is zinc neutralized ethylene-methacrylic acid copolymer.

4. The thermoplastic coating composition of claim 1, wherein said unsaturated dicarboxylic anhydride of said unsaturated dicarboxylic anhydride compatibilizer is selected from the group consisting of maleic, itaconic, aconitic and citraconic anhydrides.

5. The thermoplastic coating composition of claim 4, wherein said unsaturated dicarboxylic anhydride compatibilizer is maleic anhydride.

6. The thermoplastic coating composition of claim 1, wherein said unsaturated dicarboxylic anhydride compatibilizer is an unsaturated dicarboxylic anhydride modified thermoplastic polymer compatibilizer, wherein said unsaturated dicarboxylic anhydride is selected from the group consisting of maleic, itaconic, aconitic and citraconic anhydrides, and wherein said thermoplastic polymer is selected from the group consisting of polyethylene homopolymers and ethylene propylene copolymers.

7. The thermoplastic coating composition of claim 6, wherein said unsaturated dicarboxylic anhydride modified thermoplastic polymer compatibilizer is maleic anhydride modified polyethylene.

8. A thermoplastic coating composition comprising:
    a. nylon 11;
    b. zinc neutralized ethylene-methacrylic acid copolymer; and
    c. maleic anhydride modified polyethylene;
wherein said zinc neutralized ethylene-methacrylic acid copolymer is present in an amount ranging from about 18 to about 27% by wt. based on the total amount of nylon 11 present in said composition; and wherein said maleic anhydride of said maleic anhydride modified polyethylene is present in an amount ranging from about 0.2 to about 4.0% by wt. based on the total amount of zinc neutralized ethylene-methacrylic acid copolymer present in said composition.

9. A thermoplastic coating composition comprising:
    a. a polyamide selected from the group consisting of nylon 610, nylon 612, nylon 11, nylon 12 and blends thereof;
    b. an ionic copolymer of at least one α-olefin having from 2 to 6 carbon atoms and at least one α,β-unsaturated organic carboxylic acid having from 3 to 6 carbon atoms which is partially or completely neutralized with magnesium ions; and
    c. an unsaturated dicarboxylic anhydride compatibilizer;
wherein said ionic copolymer is present in an amount ranging from about 18 to about 27% by wt. based on the total amount of polyamide present in said composition; and wherein said unsaturated dicarboxylic anhydride of said unsaturated dicarboxylic anhydride compatibilizer is present in an amount ranging from about 0.2 to about 4.0% by wt. based on the total amount of ionic copolymer present in said composition.

* * * * *